United States Patent [19]
Peltier, Jr. et al.

[11] Patent Number: 5,972,227
[45] Date of Patent: *Oct. 26, 1999

[54] PROCESS FOR DISINFECTING ORGANIC WASTE SLUDGE

[76] Inventors: Morris Peltier, Jr., 1140 Honeycomb Dr., Cade, La. 70519; Eddie P. Mayeux, Sr., 125 Walker Gravel Pit Rd., Dry Prong, La. 71423

[*] Notice: This patent is subject to a terminal disclaimer.

[21] Appl. No.: 08/737,389

[22] PCT Filed: Sep. 11, 1996

[86] PCT No.: PCT/US96/14961

§ 371 Date: Nov. 8, 1996

§ 102(e) Date: Nov. 8, 1996

[87] PCT Pub. No.: WO98/11023

PCT Pub. Date: Mar. 19, 1998

Related U.S. Application Data

[63] Continuation-in-part of application No. 08/444,144, May 18, 1995, Pat. No. 5,599,461, which is a continuation-in-part of application No. 08/341,801, Nov. 18, 1994.

[51] Int. Cl.$^6$ .................. C02F 1/50; C02F 11/00
[52] U.S. Cl. .................. 210/764; 422/28; 422/32; 210/752

[58] Field of Search .................. 210/764, 752; 422/28, 32; 71/11, 12, 13, 14, 23, 24, 25

[56] References Cited

U.S. PATENT DOCUMENTS

| | | | |
|---|---|---|---|
| 3,942,970 | 3/1976 | O'Donnell | 71/12 |
| 4,067,896 | 1/1978 | Pierce | 260/454 |
| 4,509,696 | 4/1985 | Donaldson | 210/738 |
| 4,729,831 | 3/1988 | Fujino | 210/631 |
| 4,935,447 | 6/1990 | Philips et al. | 514/640 |
| 5,077,314 | 12/1991 | Philips et al. | 514/640 |

*Primary Examiner*—Peter A. Hruskoci
*Assistant Examiner*—Betsey J. Morrison
*Attorney, Agent, or Firm*—The Onebane Law Firm; Joseph L. Lemoine, Jr.; Jesse D. Lambert

[57] ABSTRACT

Disclosed is a process for disinfecting the sludge bi-product of an organic waste stream of pathogenic bacteria and helminth ova commonly found in organic sludges, which includes the step of intimately contacting sludge with an effective amount of an aqueous solution having a solute of at least one of a class of chemical compounds which liberate methyl-isothiocyanate gas upon commingling with organic sludge. Following disinfection the sludge may be subjected to supplemental process for extermination of enteric virus and/or conditioned for recycling as a nutricious plant medium.

34 Claims, No Drawings

PROCESS FOR DISINFECTING ORGANIC WASTE SLUDGE

This application is a PCT application which is related to previously filed U.S. application Ser. No. 08/341,801 of Peltier, et al, riled Nov. 18, 1994 (original filing), now U.S. Pat. No. 5,575,928, issued Nov. 19, 1996 and to U.S. application Ser. No. 08/444,144 of Peltier, et al, filed May 18, 1995 (which is a continuing-in-part application of U.S. application Ser. No. 08/341,801 of Peltier, et al, filed Nov. 18, 1994), now U.S. Pat. No. 5,599,461, issued Feb. 4, 1997.

In the United States, this application is a continuing-in-part application of U.S. application Ser. No. 08/444,144, filed May 18, 1995, now U.S. Pat. No. 5,599,461 of Peltier, et al. No claim of international priority date is made under PCT rules, as this application is filed more than one year after the filing date identified applications.

1. FIELD OF INVENTION

The invention disclosed herein relates generally to the field of treating sludges which are formed as a by-product of waste stream comprised of organic wastes, sometimes referred to as organic waste sludges. Typically deposited as a sediment, such sludges are typically comprised of precipitated organic solids and 50–80 percent, by weight, moisture content. Such sludges are typically in the form of a wet, cohesive, semi-plastic, odoriferous mass. By reason of their biological origin, such sludges are usually inoculated with a variety of pathogenic organisms, including pathogenic bacteria and helminth ova. Due to the high organic content and moisture of such sludges, pathogenic bacteria and helminth ova typically flourish therein, thereby presenting biological hazards to human, animal and plant life coming into contact with such sludges. Such sludges also tend to attract numerous vectors (animals such as insects, rodents and birds) which tend to directly and indirectly spread the hazards of the sludges beyond the point of collection or disposal. Accordingly non-disinfected, raw organic waste sludges are not only disagreeable to handle, but are difficult to safely transport, dispose of or beneficially reuse.

On the other hand the high organic and nitrogen content of such sludges makes them ideal for recycling as a nutricious planting medium, providing they could be disinfected without substantially depleting their nitrogen content. Accordingly, the invention set forth herein provides a process for extermination of pathogenic bacteria and helminth ova in organic waste sludges without substantially depleting the nitrogen content of such sludges.

2. DESCRIPTION OF RELATED ART

Organic waste sludges are an inevitable by-product of waste streams containing biological matter, such as municipal and private waste treatment plants, feed lot operations, sawmills, paper mills, slaughtering operations and other operations wherein wastes of organic origin collect as a consequence of principal operations being conducted. Such sludges typically form as a waste stream sediment comprised of precipitated matter of biological origin and water; existing in the form of an odoriferous, vector attracting, wet, cohesive mass. As a consequence of their biological origin such sludges are frequently contaminated with pathological bacteria and helminth ova. Accordingly, non-disinfected organic waste sludges are typically hazardous to human, animal and plant life, are foul smelling, have physical characteristics which make them difficult to handle and transport, and, are attractive to numerous vectors which tend to spread the hazards of the sludge beyond the point of their collection or disposal.

In an effort to deal with the substantial problem of pathogens in organic waste sludges, a number of methods have been developed. Many of the presently used methods are set forth in United States Code, 40 CFR Part 257. These include aerobic digestion, anaerobic digestion, lime stabilization, air drying, composting, heat drying, heat treatment, gamma irradiation, electron irradiation and other methods shown on Table 6-1 of said regulation.

In addition, U.S. Pat. Nos. 5,281,341 and 4,793,927 to Reimer discloses methods for disinfection of an organic waste sludge with nitrous acid or ammonia. U.S. Pat. No. 3,942,970 to O'Donnell discloses a method for disinfecting organic waste sludge with N-methylol-urea solution and then reacting the methylol solution with an acid.

All of the previously known methods for disinfection of organic waste sludges involve one or more of the following disadvantages:

a) substantial time of treatment,
b) high energy usage,
c) use of complex, expensive, permanently located equipment,
d) transport of pathogen bearing sludges to a permanently located treating facility,
e) use of expensive, difficult to handle and/or dangerous chemicals which may leave substantial chemical residue and/or
f) substantial depletion of the nitrogen content of the sludge.

The invention disclosed herein substantially reduces the aforesaid disadvantages by providing a simple, fast and effective method for disinfection of organic waste sludges; with inexpensive chemicals and equipment which may be portable, without substantial reduction of the nitrogen content of the sludge and without leaving substantial chemical residue.

While various solutions which generate methyl-isothiocyanate are generally known to be effective at reducing the population of certain microorganisms, it is believed that such solutions have not been previously used for disinfection of organic waste sludges according to the present invention nor have such solutions been disclosed to be effective as a helminth ovicide in organic waste sludges.

Previously helminth ova have been considered highly resistive to extermination by aqueous-based salt solutions. While no claim is made to the exact biological process by which the solutions disclosed herein exterminate helminth ova, it is believed that methyl-isothiocyanate gas, liberated by commingling of the disclosed solutions and sludge, is able to penetrate the tough outer covering of helminth ova, form substituted thioureas within amino groups of the ova itself, thereby inhibiting enzymatic activity essential for continued viability of the ova, resulting in demise of the ova.

SUMMARY OF THE INVENTION

The principal objects of the invention disclosed herein are to provide a simple, fast and effective means for disinfecting organic sludge of pathogenic bacteria and helminth ova without substantially deleting the nitrogen content of the sludge. Another object of the invention is to provide improved means for reducing the odoriferous characteristics and vector attraction of organic waste sludge. A further object of the invention is to provide a method for treating organic waste sludge which is practiced with inexpensive chemicals and equipment which may be portable.

The invention disclosed herein may be utilized to accomplish each of the above objects set forth above. Pathogenic bacteria and helminth ova found in organic sludge are effectively exterminated by the step of thoroughly contacting the organic sludge with an effective amount of aqueous solution containing a solute of one or more chemical salts which liberate methyl-isothiocyanate gas when mixed with organic sludge. Said step also reduces the odoriferous characteristics and vector attraction of the sludge, without substantially depleting the nitrogen content of the sludge. In addition to disinfection of pathogenic bacteria and helminth ova, the sludge may be further treated, by known means, for disinfection of virus and/or improve its physical properties for recycling as a fertilizer.

DESCRIPTION OF THE PREFERRED EMBODIMENT

In the preferred embodiment of the invention, the preferred method of disinfecting an organic waste sludge of pathogenic bacteria and helminth ova includes the step of thoroughly commingling the sludge with an effective amount of aqueous solution containing a solute of sodium N-methyldithiocarbamate. In strong aqueous solution sodium N-methyldithiocarbamate is considered a stable solution, but when diluted to form a weak solution decomposes releasing methyl-isothiocyanate gas. While no claim is made to the exact biological process by which methyl-isothiocyanate constitutes an effective biocide of pathogenic bacteria found in organic waste sludge, it is believed that methyl-isothiocyanate alters the structure of primary or secondary amine groups of biologically important molecules of bacteria, such as peptides and proteins, forming substituted thioureas. These altered molecules appear to have inhibited enzymatic activity. Once enzymatic activity is sufficiently inhibited, the bacteria becomes non-viable. Since methyl-isothiocyanate reacts with a wide variety of biomolecules, it is an effective biocide for all known pathogenic bacteria found in organic waste sludges.

Likewise the invention herein discloses that thorough commingling of an organic waste sludge, containing approximately 50–80 percent (by weight) moisture content with an effective amount of aqueous solution containing a solute of a chemical salt which releases methyl-isothiocyanate gas when diluted, such as sodium N-methyldithiocarbamate, is an effective biocide for helminth ova in such sludge. Previously helminth ova were generally considered highly resistant to extermination by aqueous-based salt solutions. While no claim is made as to the exact reason that helminth ova are resistant to previously known salt solutions, it is believed that the outer casing of said ova is generally impervious to liquid penetration; thus water cannot carry biocidal salts to the ova itself. It is, however, known that the covering of helminth ova is permeable to at least some gases, as an oxygen exchange does occur across said casing (the ova will expire if maintained for a sufficient time in an oxygen deprived environment). While no claim can be made to the particular biological mechanism by which methyl-isothiocyanate releasing salts form an effective biocide for helminth ova, it is believed that methyl-isothiocyanate gas is able to penetrate the covering of the ova, and once admitted to the ova itself is able to form thioureas on biologically essential molecules of the ova, altering the function of said molecules and thereby causing the ova to expire.

While an aqueous solution containing a solute of sodium N-methyldithiocarbamate is preferred, primarily because of its general availability and low cost, there is a class of chemical salts which also release methyl-isothiocyanate gas when diluted in an organic waste sludge containing substantial moisture content. Such chemical salts include potassium N-methyldithiocarbamate and tetrahydro-3,5-dimethly-2H-1,3,5-thiadiazine-2-thione which are currently used as soil "fumigants", for control of germinating weeds, parasitic nematodes, fungi and insects. Any alkali metal salts of monomethyldithiocarbamate or monoalkyldithiocarbamate of any cation, such as sodium, potassium, lithium, cesium or heavier metals are also included in said class, but are more expensive to manufacture and not generally commercially available. Alkaline earth metal salts, such as magnesium, calcium, strontium, etc., of monomethyldithiocarbamate or monoalkyldithiocarbamate are also included in the class, but would also be more expensive to manufacture and are less commercially available.

Whatever methyl-isothiocyanate gas releasing chemical salt, or plurality of salts, is employed in aqueous solution to exterminate pathogenic bacteria and helminth ova in organic waste sludges, the effective biocide of such organisms is methyl-isothiocyanate. While tests have determined that a concentration of as low as 40 parts per million of methyl-isothiocyanate releasing salt is effective as a biocide for pathogenic bacteria and helminth ova in an organic waste sludge, to provide a margin of safety in the preferred embodiment sufficient aqueous solution (which may vary according to the concentration of the solution) is thoroughly commingled with the organic waste sludge to be treated so that the admixture contains a concentration of at least 150 parts per million of methyl-isothiocyanate releasing salt. Concentrations as high as 1350 parts methyl-isothiocyanate releasing salt have been tested without any depletion of the nitrogen content of the sludge. In fact after application a by-product of methyldithiocarbamate is methylamine which is eventually converted to an ammonium ion, carbon dioxide and water which enhances the fertilizing quality of the sludge. There is, however, some sodium residue, albeit small in the preferred concentration disclosed, from use of sodium N-methyldithiocarbamate as the methyl-isothiocyanate releasing salt. Accordingly, if disinfected sludge is to be applied as a fertilizer to soil that is already laden with sodium chloride (which condition does exist in some areas), potassium N-methyldithiocarbamate, or one of the other sodium free methyl-isothiocyanate releasing chemical salts described above would preferably be employed.

In the preferred embodiment of the invention thorough mixing of sludge with the disinfecting solution described above is readily accomplished by a portable double auger/paddle mixer, such as a Roto-Mix 6000. Use of portable apparatus, such as the Roto-Mix 6000, permits treatment of non-disinfected waste sludge at their point of collection rather than having to transport dangerous and difficult to handle sludge to a permanently located facility. Mixing should be of sufficient speed and duration to assure intimate commingling of sludge and disinfecting solution. With the Roto-Mix 6000 we have found that mixing at highest speed for approximately 5 minutes provides sufficient commingling to assure extermination of all pathogenic bacteria and helminth ova. Other apparatus capable of intimately commingling a wet, sticky, cohesive mass with a relative quantity of liquid would be equally satisfactory.

While many pathogenic bacteria in an organic sludge are almost instantly killed by exposure to methyl-isothiocyanate, following commingling as aforesaid, in the preferred embodiment of the invention the treated sludge is preferrably temporarily stored in a container, which may be atmosperically vented, for at approximately 24 hours to assure thorough penetration of methyl-isothiocyanate into remote crevices and the like which may exist in various particulate matter included in the sludge. During said 24 hour period care is taken to avoid the addition of acidic substances to the sludge, as such substances are known to neutralize carbamate solutions and extinguish further methyl-isothiocyanate generation therefrom. At the end of the 24 hour period, in atmospherically vented situations, methyl-isothiocyanate generation has substantially ended, leaving only a small amount of chemical residue, primarily from the cationic metal (for example sodium, in the case of sodium N-methyldithiocarbamate usage), in the sludge.

Simultaneously with disinfection according to the present invention organic waste sludge, said sludge may also be disinfected of enteric virus by alkaline treatment. The methyl-isothiocyanate releasing salts described above have an additive effect on such treatments; that is, commingling said salts with the sludge increases the pH of the sludge, requiring less inclusion of alkaline solution to produce a pH sufficiently high (generally a pH of 12 or more) for extermination of enteric virus.

Simultaneously with disinfection of organic waste sludge, according to the present invention, said sludge may also be treated with a water-based, electrolytic soil additive. In the preferred embodiment of the invention approximately 4–12 liquid ounces per ton of sludge produce at least two beneficial effects. First, the wetting properties of such additive aids penetration of water, bearing dissolved methyl-isothiocyanate releasing salts, in and between the particulate matter of the sludge, thereby increasing the probability of methyl-isothiocyanate contact with all pathogenic bacteria and helminth ova that may be harboring therein. Secondly, inclusion of such electrolytic additive results in the disinfected sludge having improved qualities as a plant medium.

Additionally, simultaneously with disinfection of organic waste sludge, according to the present invention, said sludge may also be conditioned, for recycling as a plant medium, by adding a hydrophilic polymer, such as potassium polyacrylate. Said polymer absorbs excess water from the sludge, effectively "drying" same, making the sludge less cohesive and easier to handle. The addition of polymer also improves the water retention characteristic of the admixture, which produces a number of desirable effects. First, improved water retention characteristics reduce the ability of odoriferous molecules to escape from mixture, further reducing odor and vector attraction. Secondly, increased water absorption provides for increased retention time of methyl-isothiocyanate dissolved therein, thereby providing an increased period of contact between methyl-isothiocyanate and pathogenic organisms. Finally, increased water retention and reduced evaporation improves the characteristics of the disinfected sludge for use as an agricultural medium and/or soil conditioning agent. Mixing of approximately 2 pounds of powdered potassium polyacrylate per ton has been found effective for sludges bearing approximately 80% water content. Dosage may, however, be varied depending on the absorbency of the particular hydrophilic polymer chosen. Any amount of hydrophilic polymer may be added to produce an end product having desired physical properties.

A final, also optional, step in making an easily usable agricultural medium is the inclusion of bulk, non-pathogenic organic and/or non-organic conditioning material. Generally, in the preferred embodiment the inclusion of non-infected conditioning material would, if practiced, occur after disinfection of the sludge as aforesaid is complete, in order to avoid using larger quantities of disinfecting chemicals which would be required to produce effective concentrations of said methyl-isothiocyanate releasing salts in a larger mass. An almost endless variety of such materials may be used to bind the highly enriched organic sludge to particulate matter which tends to remain in place in soil and to impart desired soil conditioning characteristics to the end product. Common organic conditioning material may include seed husks, hulls, shells, sawdust, ground animal shell and bones, boiler ash, crop stubble, leaves, hay, grass, charcoal, carbon black, diatomaceous earth and other non-pathogenic matter of biological origin. Common non-organic conditioning material would include sand, mica, vermiculite, limestone and the like. Any amount of conditioning material may be included in the disinfected sludge to produce an end product having desired properties. Once these materials are blended with the sludge (especially sewer sludge), the cohesive texture of the sludge is further reduced. In the preferred embodiment sufficient conditioning material is usually included to produce an end product having the texture of a fine potting soil mixture. Such texture facilitates application of the sludge to farm land with convention agricultural equipment or use as a potting soil. In one field test approximately 1400 lbs of treated sludge was disinfected and thoroughly mixed with approximately 2800 lbs of sawdust. The end product was a dark, finely divided, non-cohesive, powder having a slight scent of freshly tilled earth which was to be free of pathogenic bacteria and helminth ova.

The above-described preferred embodiment should be interpreted as illustrative and not in any sense of limiting the scope of the invention which is set forth in the following claims.

What is claimed is:

1. A process for disinfecting organic waste sludge comprising the step of thoroughly commingling said organic waste sludge with an aqueous based solution having a solute of an effective amount at least one of a group of chemical salts, which said salt spontaneously releases gaseous methyl-isothiocyanate when said solution is commingled with organic sludge.

2. The method of claim 1 wherein the group of chemical salts comprises at least one of a group of monomethyldithiocarbamate salts of any cation.

3. The method of claim 2 wherein the monomethyldithiocarbamate salt used comprises at least one having a metal cation.

4. The method of claim 3 wherein the monomethyldithiocarbamate salt having a metal cation comprises at least one having a sodium cation.

5. The method of claim 4 wherein the monomethyldithiocarbamate salt having a sodium cation comprises sodium N-methyldithiocarbamate.

6. The method of claim 3 wherein the monomethyldithiocarbamate salt having a metal cation comprises at least one having a potassium cation.

7. The method of claim 6 wherein the monomethyldithiocarbamate salt having a potassium cation comprises potassium N-methyldithiocarbamate.

8. The method of claim 1 wherein the group of chemical salts comprises at least one of a group of monoalkyldithiocarbamate salts of any cation.

9. The method of claim 1 wherein the group of chemical salts comprises tetrahydro-3,5-dimethly-2H-1,3,5-thiadiazine-2-thione.

10. The method of claim 1 wherein said effective amount of chemical salts is at least 1000 parts of chemical salt per million parts of said sludge.

11. The method of claim 1 wherein said effective amount of chemical salts is at least 150 parts of chemical salt per million parts of said sludge.

12. The method of claim 1 wherein said effective amount of chemical salts is at least 70 parts of chemical salt per million parts of said sludge.

13. The method of claim 1 wherein said effective amount of chemical salts is at least 40 parts of chemical salt per million parts of said sludge.

14. The method of claim 1 further comprising the step of thoroughly commingling said sludge with an effective concentration of an alkali.

15. The method of claim 14 wherein the effective concentration of an alkali solution is that which produces a pH of 12 or more of the sludge.

16. The method of claim 14 further comprising the step of thoroughly mixing an effective amount of hydrophilic polymer with the organic sludge.

17. The process of claim 14 further comprising the step of thoroughly mixing an effective amount of at least one of a group of non-pathogenic conditioning material with the organic sludge.

18. The method of claim 14 further comprising the step of thoroughly commingling said sludge with an effective amount of water based, electrolytic soil additive with the organic sludge.

19. The process of claim 18 further comprising the step of thoroughly mixing an effective amount of at least one of a group of non-pathogenic conditioning material with the organic sludge.

20. The method of claim 18 further comprising the step of thoroughly mixing an effective amount of hydrophilic polymer with the organic sludge.

21. The process of claim 20 further comprising the step of thoroughly mixing an effective amount of at least one of a group of non-pathogenic conditioning material with the organic sludge.

22. The method of claim 1 further comprising the step of thoroughly commingling said sludge with an effective concentration of an alkali solution.

23. The method of claim 22 wherein the effective concentration of an alkali solution is that concentration which produces a pH of 12 or more of the sludge.

24. The method of claim 22 further comprising the step of thoroughly mixing an effective amount of hydrophilic polymer with the organic sludge.

25. The process of claim 22 further comprising the step of thoroughly mixing an effective amount of at least one of a group of non-pathogenic conditioning material with the organic sludge.

26. The method of claim 22 further comprising the step of thoroughly commingling said sludge with an effective amount of water based, electrolytic soil additive with the organic sludge.

27. The process of claim 26 further comprising the step of thoroughly mixing an effective amount of at least one of a group of non-pathogenic conditioning material with the organic sludge.

28. The method of claim 26 further comprising the step of thoroughly mixing an effective amount of hydrophilic polymer with the organic sludge.

29. The process of claim 28 further comprising the step of thoroughly mixing an effective amount of at least one of a group of non-pathogenic conditioning material with the organic sludge.

30. The method of claim 1 further comprising the step of thoroughly commingling said sludge with an effective amount of water based, electrolytic soil additive with the organic sludge.

31. The method of claim 30 further comprising the step of thoroughly mixing an effective amount of hydrophilic polymer with the organic sludge.

32. The process of claim 30 further comprising the step of thoroughly mixing an effective amount of at least one of a group of non-pathogenic conditioning material with the organic sludge.

33. The method of claim 1 further comprising the step of thoroughly mixing an effective amount of hydrophilic polymer with the organic sludge.

34. The process of claim 1 further comprising the step of thoroughly mixing an effective amount of at least one of a group of non-pathogenic conditioning material with the organic sludge.

* * * * *